United States Patent
Sacca (10) Patent No.: US 7,027,102 B2
(45) Date of Patent: Apr. 11, 2006

(54) SOFTWARE DECODING OF COMPOSITE VIDEO WITHOUT A PHASE-LOCKED LOOP

(76) Inventor: Frank Sacca, 23036 Rio Lobos Rd., Diamond Bar, CA (US) 91765

(*) Notice: Subject to any disclaimer, the term of this patent is extended or adjusted under 35 U.S.C. 154(b) by 369 days.

(21) Appl. No.: 10/073,088

(22) Filed: Feb. 9, 2002

(65) Prior Publication Data

US 2002/0186323 A1    Dec. 12, 2002

Related U.S. Application Data

(60) Provisional application No. 60/267,316, filed on Feb. 8, 2001.

(51) Int. Cl.
  *H04N 9/67* (2006.01)
  *H04L 7/00* (2006.01)
(52) U.S. Cl. ...................... 348/572; 348/659; 348/539
(58) Field of Classification Search ................ 348/659, 348/539, 572, 453, 441, 708, 713, 507, 638, 348/639, 660, 527
  See application file for complete search history.

(56) References Cited

U.S. PATENT DOCUMENTS

| | | | | |
|---|---|---|---|---|
| 4,549,297 A | * | 10/1985 | Nishimoto | 714/749 |
| 4,768,015 A | * | 8/1988 | Amano | 348/572 |
| 4,788,585 A | * | 11/1988 | Suzuki | 348/194 |
| 4,970,581 A | * | 11/1990 | O'Gwynn | 348/527 |
| 5,416,510 A | * | 5/1995 | Lipton et al. | 348/43 |
| 5,459,524 A | * | 10/1995 | Cooper | 348/507 |
| 5,546,194 A | * | 8/1996 | Ross | 358/445 |
| 5,793,950 A | * | 8/1998 | Suzuki et al. | 714/57 |
| 6,380,967 B1 | * | 4/2002 | Sacca | 348/14.01 |

* cited by examiner

Primary Examiner—Victor R. Kostak (57) ABSTRACT

A software decoder for converting standard composite video to RGB color components without a phase-locked loop. Subcarrier phase recovery for each video line is accomplished by performing a single DFT computation on the color burst samples for the frequency closest to the subcarrier frequency. The recovered subcarrier phase is added for each line to the orthogonal subcarriers which are mixed with the modulated chrominance for decoding of color difference signals I and Q. Digital composite video capture and store circuitry may be used to buffer the acquisition of real-time video to the speed of a DSP used for software processing. Interpolation can be used in the processing of digital composite video to improve vertical line alignment. Multiple composite video formats, such as NTSC and PAL, can be decoded with minor modifications in the software decoder operation. A cost-effective analog composite video interface to a personal computer can be implemented with minimal hardware for displaying, processing, storing, or transmission of digital video.

11 Claims, 8 Drawing Sheets

SOFTWARE DECODING OF COMPOSITE VIDEO WITHOUT A PHASE-LOCKED LOOP

BACKGROUND—CROSS-REFERENCE TO RELATED APPLICATIONS

The present application is based on and claims priority to U.S. Provisional Application Ser. No. 60/267,316, filed on Feb. 8, 2001.

BACKGROUND—INCORPORATION BY REFERENCE

The following patent applications are hereby incorporated by reference in their entirety, including drawings, and are hereby made part of this application for all purposes:

1) U.S. patent application Ser. No. 08/762,884, filed on Dec. 7, 1996, entitled "Video Image Facsimile Machine (Videofax)";
2) U.S. Provisional Application Ser. No. 60/146,697, filed on Jul. 30, 1999;
3) U.S. patent application Ser. No. 09/630,176, filed on Aug. 1, 2001, entitled "Videofax System with Progressive Image Display."

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

1. Field of Invention

The present invention relates to composite video decoders, specifically a software decoder which converts composite video to standard color components red, green, and blue without a phase-locked loop.

2. Prior Art

Figure 1:
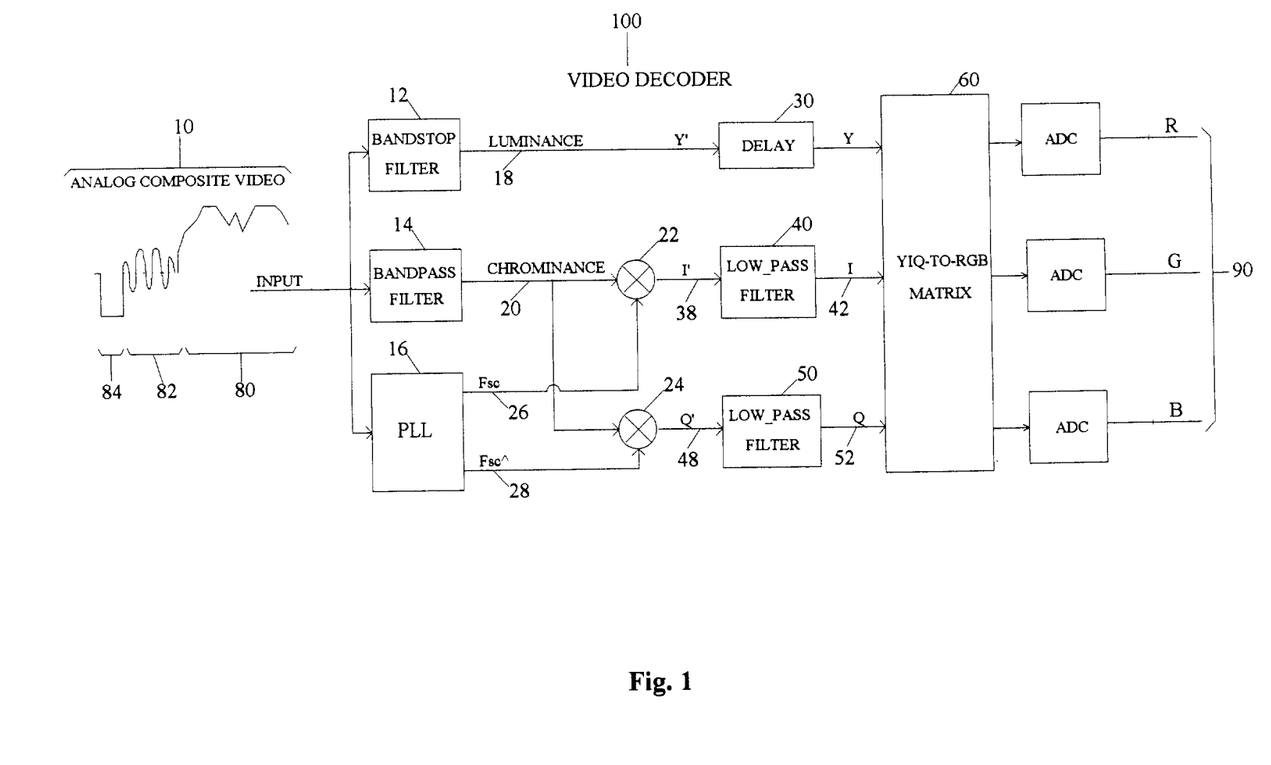
FIG. 1 shows a block diagram of a composite video decoder according to the prior art.

A traditional composite video decoder is generally implemented as an integrated circuit (IC) according to the basic configuration shown in FIG. 1. A decoder 100 essentially converts analog composite video to color components red, green, and blue (RGB signals) 90, which added in all possible combinations reproduce the entire color spectrum on a typical cathode ray tube color display, for example. RGB signals can be displayed directly on a picture tube in real time, stored as a bitmap image, or processed further to a given video format for compression, transmission, or storage.

Decoder 100 generally comprises a phase-locked loop (PLL) 16, two mixers 22 and 24, and a number of filters 12, 14, 30, 40, and 50. The decoding process takes place in multiple, simultaneous steps. Analog composite video is first separated into a luminance 18 and a chrominance 20 by means of a band-stop filter 12 and a band-pass filter 14, respectively. Chrominance 20 is then further processed to demodulate color component 42 (designated as I) and color component 52 (designated as Q). Most of the decoder's complexity lies in the processing of chrominance 20.

A composite video signal 10 typically includes a horizontal synchronization (sync) pulse 84, a color burst 82, and a modulated video signal 80. Sync pulse 84 simply marks the start of a video horizontal line. Color burst 82 contains frequency and phase information of the original color subcarrier used to modulate chrominance 20 into composite video (video encoding process). Modulated video 10 is the superposition of luminance 18 and chrominance 20.

PLL 16 is a local oscillator within decoder 100, which locks onto the frequency and phase of color burst 82 and regenerates a phase-synchronized local subcarrier 26. Color components I and Q can be extracted by mixing local subcarrier 26 with chrominance 20 in two parallel steps, respectively. For color component I, chrominance 20 is mixed directly with local subcarrier 26 (designated as Fsc) to generate an intermediate signal component 38 (designated as I'). Color component I is generated by passing I' through a low-pass filter 40. For color component Q, chrominance 20 is mixed with a phase-delayed local subcarrier 28 (designated as Fsc^) to generate an intermediate signal component 48 (designated as Q'). Color component Q is generated by passing Q' through a low-pass filter 50.

Phase-delayed local subcarrier 28 is identical in frequency to local subcarrier 26, but is shifted in phase by ninety (90) degrees or PI/2 radians, where PI is a constant approximately equal to 3.14. For example, if local subcarrier 26 is expressed mathematically as $\cos(2*PI*fc)$, where fc is the local subcarrier frequency, then phase-delayed local subcarrier 28 can be expressed as $\cos(2*PI*fc - PI/2)$, which is equal to $\sin(2*PI*fc)$.

Color components Y, I, and Q are converted to standard RGB video components by means of a linear transformation (summing and scaling) through an YIQ-to-RGB matrix 60. It should be understood that the color components must be processed simultaneously in the decoder. Delays in the processing of signals relative to one another must be compensated so that that the one-dimensional composite video is correctly represented by a three-dimensional RGB vector at any point in time. For example, since luminance 18 requires less processing than chrominance 20, it is necessary to introduce a delay 30 in the Y signal path to allow for the additional processing time required in the I and Q signal paths.

The system components of decoder 100 are typically analog, digital, or mixed-signal (analog and digital) hardware circuits. For example, a standard decoder may include a digital PLL, switched-capacitor filters, and analog multipliers (mixers). The choice of hardware components in the prior art is justified to support "real-time" processing of analog composite video to RGB signals and has remained undisputed in low-cost applications. Hardware circuits are best suited for real-time composite video decoding because a software-based approach would require a prohibitively high processor speed. As a result, hardware video decoders form the standard architecture in computer video cards generally available on the consumer market. Yet hardware decoders are complex and relatively expensive systems to implement and manufacture in large scale.

Further, prior art video decoders are designed to operate at a sampling frequency of exactly 13.5 megahertz (Mhz) or specific fractions thereof This frequency is an integer multiple of the horizontal line rate, and results in samples having the same horizontal position in successive lines of a video image, so that the video pixels generated after decoding are properly aligned in vertical columns. Alternatively, a sampling rate of four times the subcarrier frequency must be used in video decoders, to simplify the complexity of hardware filters. These industry standards applying to the sampling rate of video decoders generally assure excellent video quality, but are somewhat excessive for basic, low-cost applications.

OBJECTS AND ADVANTAGES

Accordingly, several objects and advantages of the present invention are:
a) To provide a software composite video decoder, which does not require a phase-locked loop;
b) To provide a low-cost video decoder to convert analog composite video to RGB color components, which can be implemented using a low-speed digital signal processor (DSP) or microcontroller;
c) To provide an efficient method for processing and displaying video pixels so that aligned vertical columns are generated on a video display, regardless of the sampling rate used to digitize the analog composite video;
d) To provide a convenient method to decode multiple composite video formats, such as NTSC (National Television Systems Conference) and PAL (Phase Alternation Line);
e) To provide a cost-effective analog composite video interface for capturing, storing, and displaying video frames or motion video on a personal computer (PC).

Further objects and advantages will be apparent from a consideration of the ensuing description and accompanying drawings.

SUMMARY OF THE INVENTION

The present invention describes an apparatus and method to convert analog or digital composite video to RCB color components in software, with minimal hardware requirements. Analog composite video is digitized by an ADC, and a high-speed DSP is programmed to process the resulting digital composite video into RGB color components. Typically, the DSP speed must be sufficiently fast to assure a conversion of each composite video line into RGB as fast as approximately 64 microseconds, which is the duration of a line. Given the software processing simplifications disclosed in the ensuing discussion, it is conceivable that a reasonably priced DSP can provide adequate speed to satisfy this requirement.

If the DSP used to decode the composite video is slow as compared to the speed requirements of real-time video, the addition of a videofax frame capture circuit can provide the necessary buffering function needed to process video frames at the highest possible speed afforded by the DSP used in a particular application. Exemplary details of a videofax frame capture circuit are described in great detail in previously incorporated U.S. patent application Ser. No. 08/762,884 and U.S. patent application Ser. No. 09/630,176.

Except for the ADC, and possibly the use of a videofax capture circuit to compensate for the DSP processing speed, all the processing from composite video to RGB is implemented in software without the need for a phase-locked loop or other hardware components. It should be noted that many DSP products available on the market today possess an integrated ADC. Also, a videofax capture circuit can be implemented by a DSP having sufficient memory to store at least one video frame. Therefore, it is conceivable to implement the teachings of the present invention in one single DSP.

A DSP as referred to in the ensuing description is generally a digital signal processor with advanced arithmetic or digital filtering functions, a microcontroller with basic arithmetic functions which may include look-up tables or temporary memory storage to implement advanced arithmetic or digital filtering functions, an application-specific integrated circuit (ASIC) or Programmable Logic Device (PLD) designed to implement specific arithmetic or filtering functions, with or without the use of look-up tables or switched-capacitor filters, or a personal computer. Basic arithmetic functions may include operations such as addition, subtraction, and Boolean functions (AND, OR, NOT); advanced arithmetic functions may include operations such as multiplication, division, and trigonometric functions (sine, cosine, arc-tangent).

The DSP may include Read-Only-Memory (ROM) for storing or executing a software program, Random-Access-Memory (RAM) for executing a software program or for storing temporary variables needed for processing, and a user control interface to select parameters required for the processing of composite video.

The DSP essentially converts digital composite video to RGB in a number of steps: detection of line start, recovery of black level and color subcarrier phase, decoding of YIQ components, and conversion of YIQ to RGB. Each step will be described in detail in the ensuing description.

Figure 2A:
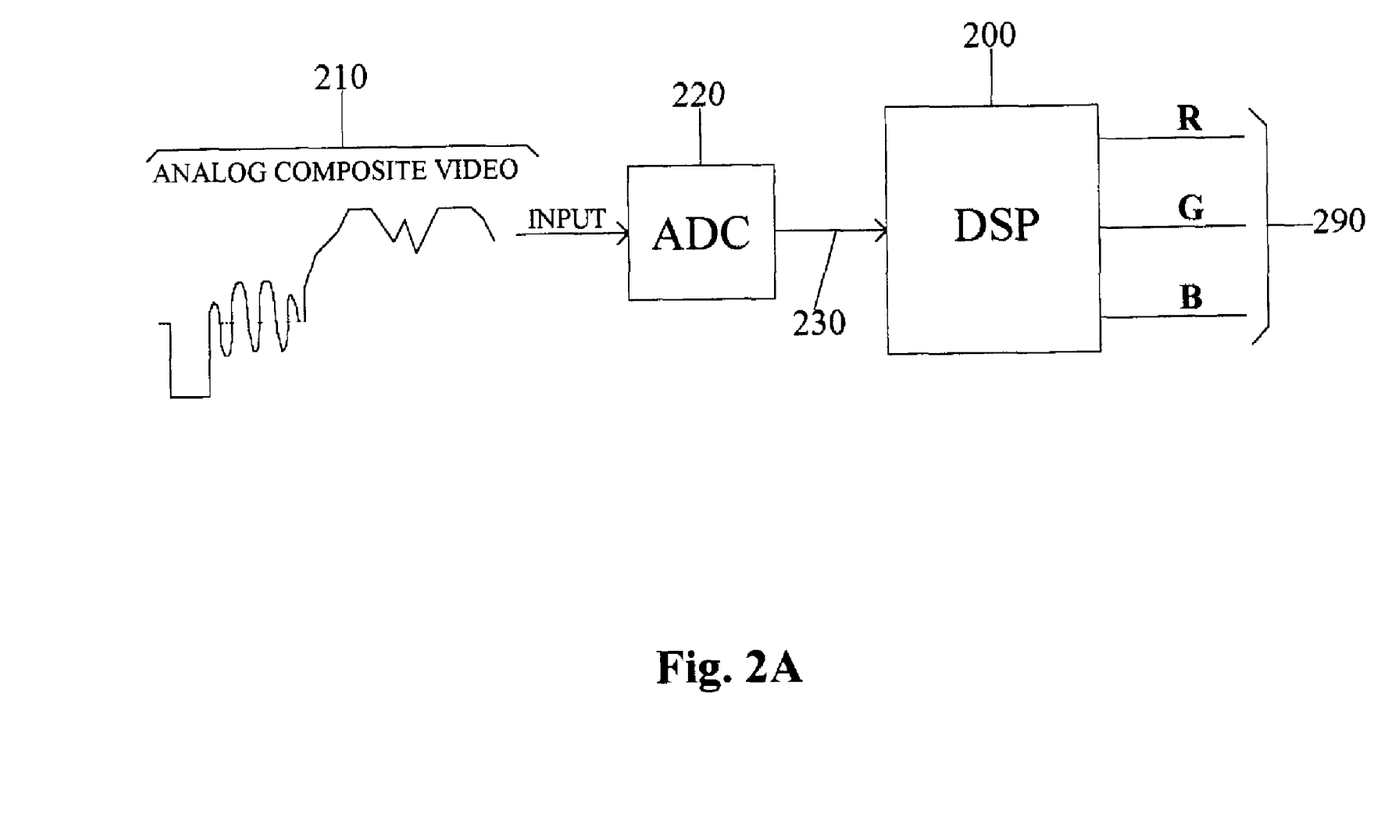
FIG. 2A shows a block diagram of a DSP composite video decoder according to the present invention.
Figure 2B:
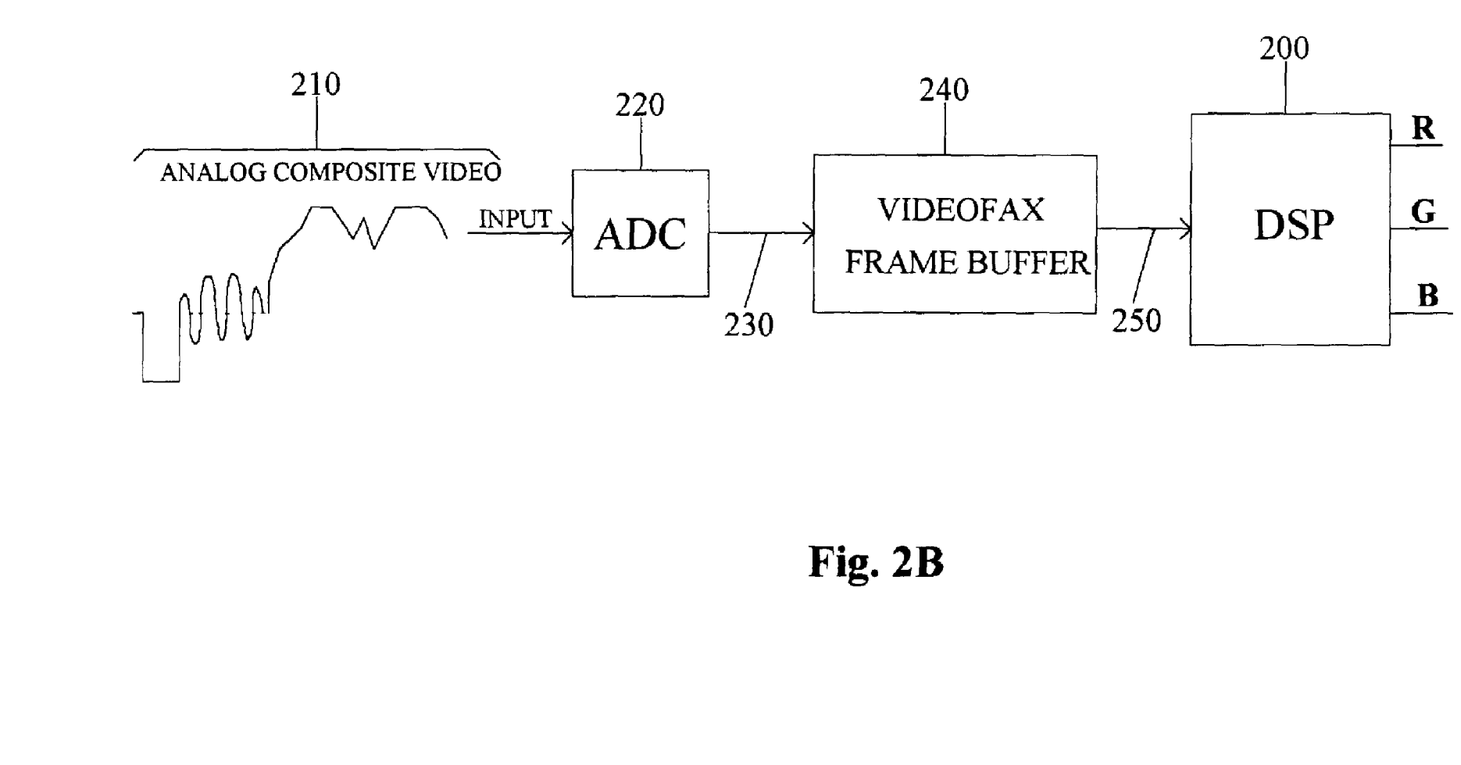
FIG. 2B shows a block diagram of an alternative configuration of the DSP composite video decoder, which includes a videofax frame buffer.

Description of FIGS. 2A and 2B—DSP Composite Video Decoder

A block diagram of the preferred embodiment of the invention is shown in FIG. 2A. The diagram includes an analog composite video signal 210, an ADC 220, a DSP 200, as defined above, and an RGB output 290. ADC 220 digitizes analog composite video 210 to a digital composite video 230. The analog composite video may be low-pass filtered before conversion by ADC 220, to prevent frequency aliasing.

An alternative embodiment of the invention is shown in FIG. 2B. Analog composite video 210 is digitized by ADC 220, and is immediately stored as digital composite video in a videofax frame buffer circuit 240. The frame capture circuit basically provides a buffering function between the digital video stream and the speed at which video can be processed, based on the capabilities of DSP 200. For example, if DSP 200 can process only one frame per second, then videofax buffer 240 will capture and store one video frame in real time.

DSP 200 can then retrieve digital video data 250 at slower speed (than real time) to convert the video frame to RGB 290 for display on a monitor at a reduced frame rate. Alternatively, RGB output 290 can be compressed to a convenient format, such as JPEG or MPEG2, for transmission over a communication channel such as the telephone line, Internet, or local area network.

Figure 3A:
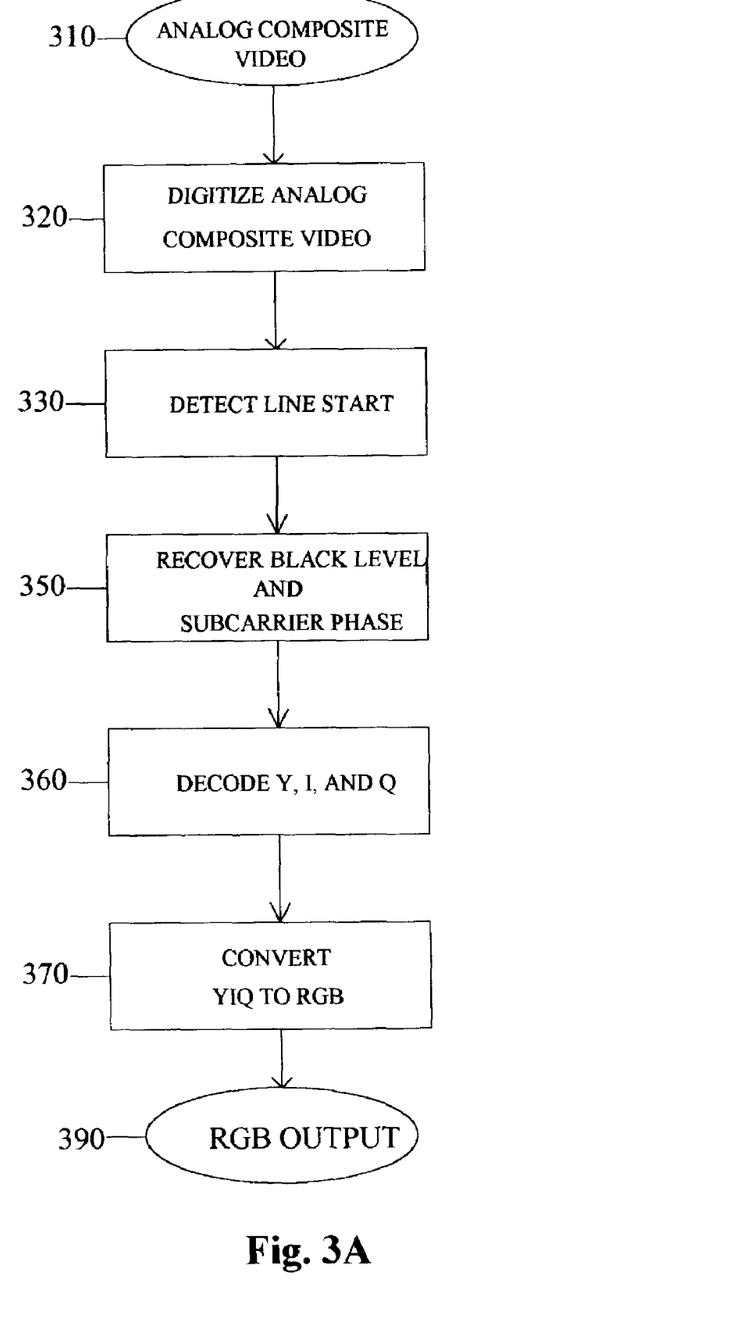
FIG. 3A shows a software composite video decoding operation flowchart of the DSP composite video decoder.
Figure 3B:
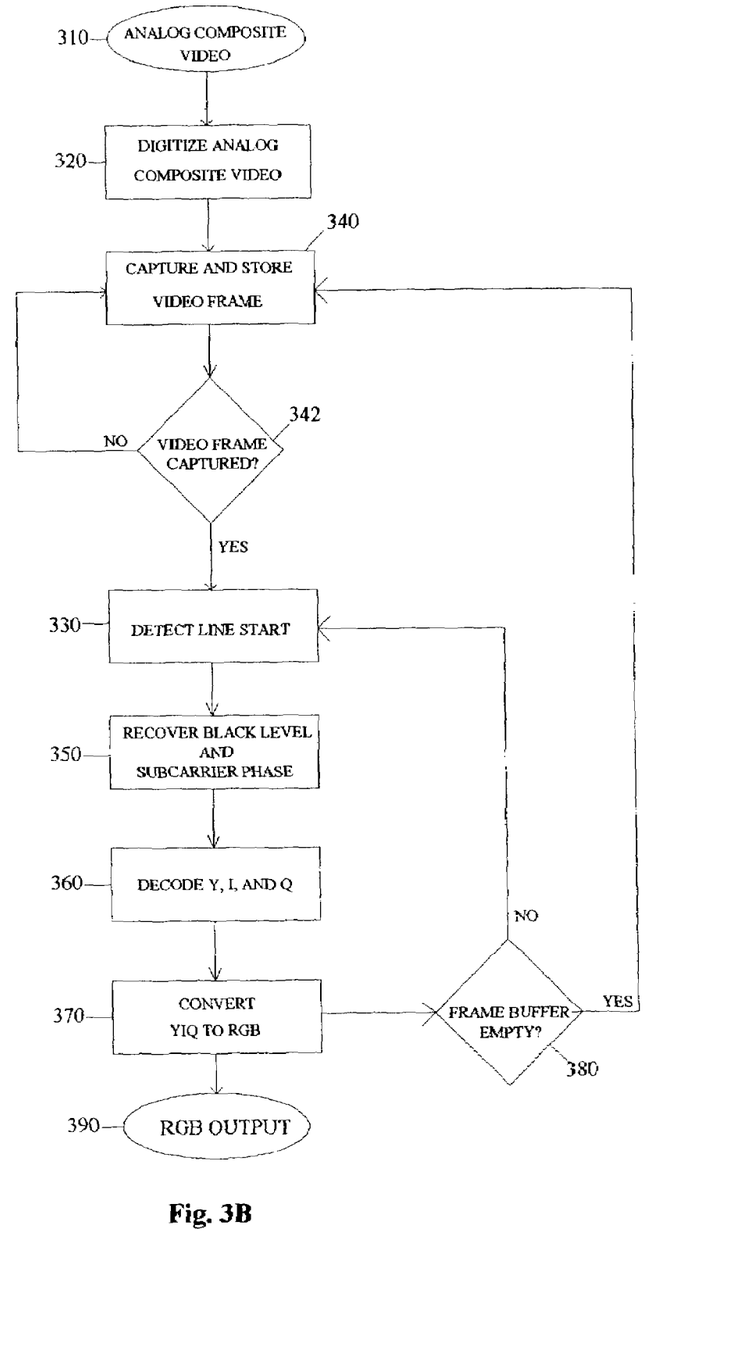
FIG. 3B shows a software composite video decoding operation flowchart of an alternative DSP composite video decoder with videofax frame buffer.

Description of FIGS. 3A and 3B—Software Composite Video Decoding

An operation flowchart of a DSP software decoding process according to the present invention is shown in FIG. 3A. An analog composite video signal 310 is first digitized in step 320, and processed by the DSP in a series of steps. The DSP first detects a video line start in step 330. The DSP then recovers the video line black level and subcarrier phase in step 350. In step 360, the DSP decodes color components Y, I, and Q (YIQ) and in step 370 it converts YIQ to an RGB output 390.

An alternative operation flowchart of DSP software decoding is show in FIG. 3B for the case of a videofax frame buffer between the ADC and the DSP. The processing steps identified in this diagram are virtually identical to those described in FIG. 3A, except for steps 340, 342, and 380. In step 340, a video frame is captured and stored in the videofax frame buffer memory. The DSP checks whether the video frame buffer has captured a complete frame in step 342, before detecting a line start (step 330). The process continues for all lines in a stored video frame, until the frame buffer memory is empty (step 380), at which time a new video frame is captured and stored (step 340).

Figure 4:
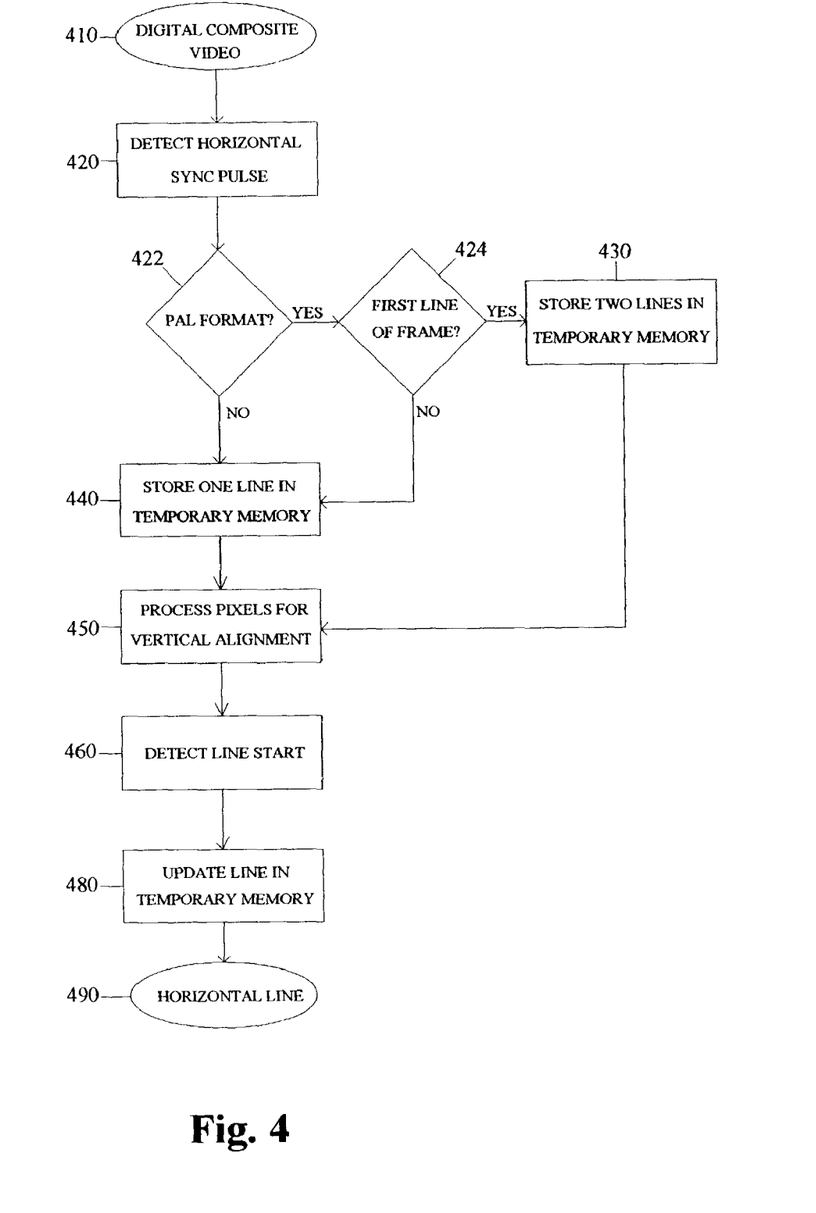
FIG. 4 shows a line start detection operation flowchart of the DSP composite video decoder.

Description of FIG. 4—Line Start Detection

The line start detection process takes place repeatedly for each video line of a digital composite video 410. The start of a line is determined by detecting the horizantal sync pulse in digital composite video 410. This can be accomplished in step 420 by detecting one or more values in the stream of digital data being lower than a certain threshold. For example, if digital composite video 410 is being represented with an 8-bit resolution, the signal can be represented by a digital range of 0–255. Under this assumption, the horizontal sync pulse is typically a stream of zeros (ideally) and the beginning of a line can be detected when the numerical value of one or more digital sample is less than 4, for example. Other thresholds can be selected depending on the noise level present in the original digitized.

After the line start is detected, an entire line is read and stored in the DSP temporary memory (step 440). Since the video line length is approximately 64 microseconds, the number of samples which must be stored in memory to encompass one complete video line can be calculated based on the video sampling rate. If the video format is PAL (step 422), it is necessary to store the first two consecutive lines of a video frame (steps 424 and 430), as will be described in FIG. 5 in reference to the detection of the "PAL switch."

In step 450, the DSP processes the video samples to assure that the pixels derived from the conversion to RGB are aligned vertically. Vertical pixels can be misaligned if the frequency selected for the sampling rate is not in a specific numerical relationship with the line rate.

Vertical alignment correction can be accomplished by interpolation. For each array of data representing a line, a fixed number zeros (predetermined) are added between actual video samples. For example, if three zeros are to be added and the video samples are 120, 130, and 140, then the new stream of samples will be 120, 0, 0, 0, 130, 0, 0, 0, 140, 0, 0, 0. The resulting array with interpolated zeros is processed though a low-pass filter, which may be a digital filter, and then multiplied by a factor representing the average loss resulting from the addition of zeros.

Interpolation essentially adds extrapolated pixels to each line (without improving actual video resolution, of course), which results in a more continuous definition of line pixels. Therefore, if two lines are misaligned because the sampling rate is inappropriate, interpolated pixels, rather than true samples, can be selected on both lines so that vertical alignment of pixels is achieved. This process can be effectively accomplished by determining a more accurate or interpolated line start (step 460) on the rising edge of a horizontal sync pulse, for example.

After interpolated pixels are generated and a more accurate line start is detected, the extra number of samples introduced in the original array of data can be discarded. In step 480, the interpolated line is stored in temporary memory, replacing the original video line. The temporary memory now holds an improved representation of a horizontal line 490, which has been corrected for vertical alignment regardless of sampling sampling rate.

Figure 5:
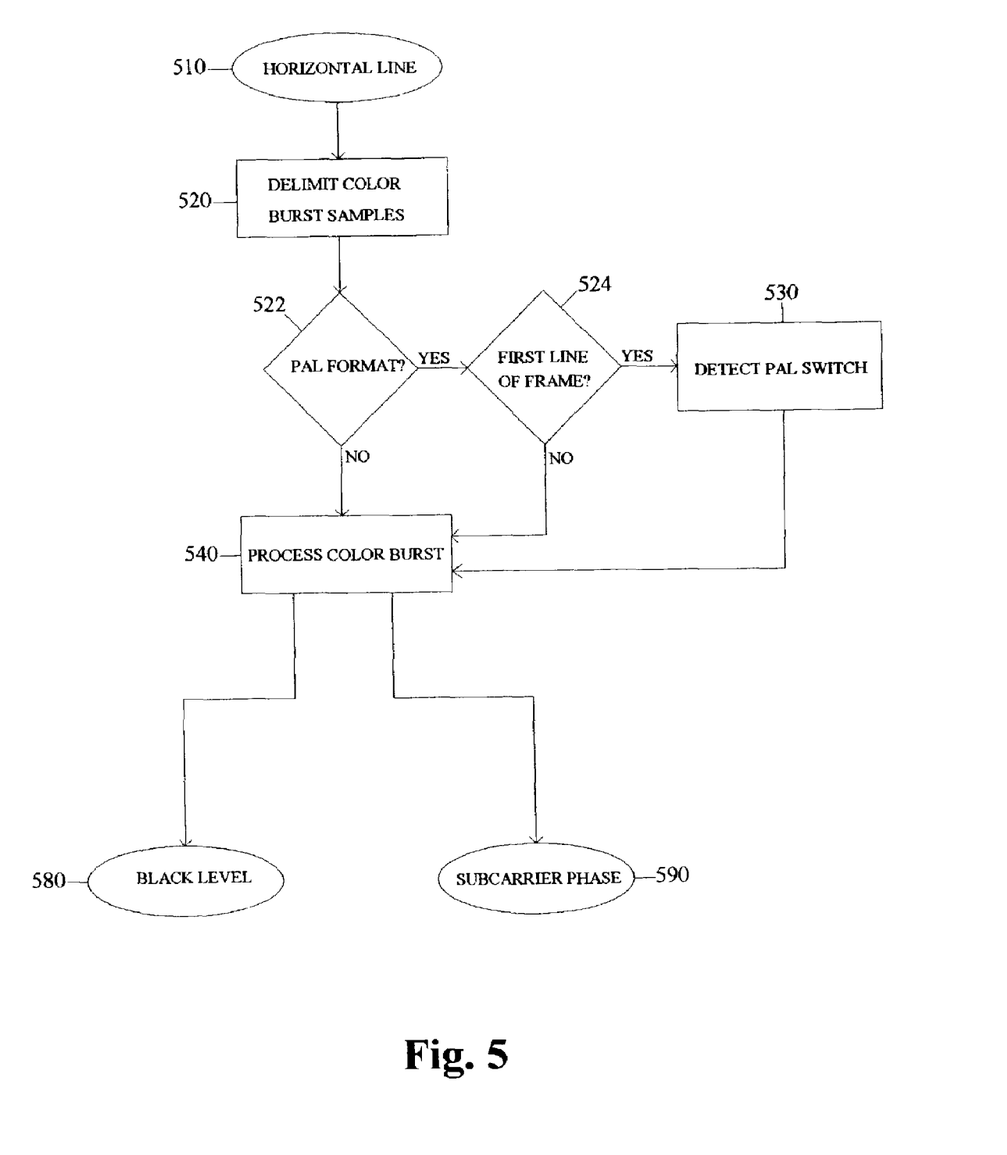
FIG. 5 shows a black level and subcarrier phase recovery operation flowchart of the DSP composite video decoder.

Description of FIG. 5—Black Level and Subcarrier Phase Recovery

After a line start has been detected from an interpolated horizontal line 510, the color burst samples are delimited within the digital data stream. Typically, the color burst begins with a short delay after the line start (rising edge of horizontal sync pulse), and the number of samples are fixed for a given sampling rate. Therefore, one way to delimit color bur st samples in step 520 is to skip a fixed number of samples (delay) after the line start, and then acquire the expected number of samples for the color burst.

Both the black level and the phase of the color subcarrier can be determined in a single step 540 by calculating a discrete Fourier transform (DFT) of the color burst samples. To simplify the DFT calculation, a number of samples equal to multiples of 2 should be selected, such as 8, 16, or 32, for example. Typically, a DFT calculation would result in a DC component and a series of coefficients representing the amplitude and phase of the color burst frequency components. It is easy to see that the DC component of the color burst in the DFT is actually the black level reference of the line being decoded.

Since the color burst is a single frequency of known value and its amplitude is irrelevant, all the coefficients of the DFT can be effectively ignored except for only one coefficient, which represents the phase of the frequency closest to the known frequency of color burst. For example, for a sampling rate of 8 Mhz and a color burst of 3.58 Mhz, a 32-point DFT would result in 32 coefficients to represent amplitude and phase component of the signal. However, since the color burst is known to be a single frequency at 3.58 Mhz and the amplitude is not relevant, the phase of the color burst can be calculated simply by using the 14th coefficient of the phase component, which corresponds to frequency component 3.5 Mhz (8 Mhz divided by 16, which yields frequency components of 250 Khz. Therefore, component 14 corresponds to 3.5 Mhz).

As a result of this dramatic simplification, it is possible to extract the phase of the color burst by effectively computing only one coefficient, performing one single operation to compute the phase of only one frequency component. Once the phase is calculated, it has to be adjusted with respect to half or full radial cycles, to obtain a corrected subcarrier phase 590 (PHI). An example of equations for NTSC decoding, assuming a sampling frequency of 8 Mhz, is shown below:

```
        for( UINT x = 0; x < 32; x++) ; x++ )
        {
            dwTotal += fbptrData[x];
            dwTemp = 2 * 3.1415926535897932 * (14.0/32.0) * x;
            float cosTemp = (float)cos( dwTemp );
            float sinTemp = (float)sin( dwTemp );
            dwPhiTempA += fbptrData[x]* cosTemp;
            dwPhiTempB += fbptrData[x]* sinTemp;
        }
        dwTotal = 32;
        if( dwPhiTempA >= 0 && dwPhiTempB >= 0 )
            fdwPhiP = 2*PI + atan( -(dwPhiTempB/dwPhiTempA) );
        else if( dwPhiTempA < 0 && dwPhiTempB < 0 )
            fdwPhiP = PI + atan( -(dwPhiTempB/dwPhiTempA) );
        else if( dwPhiTempA < 0 && dwPhiTempB >= 0 )
            fdwPhiP = PI + atan( -(dwPhiTempB/dwPhiTempA) );
        else if( dwPhiTempA >= 0 && dwPhiTempB < 0 )
            fdwPhiP = atan( -(dwPhiTempB/dwPhiTempA) );
    fdwPhi = fdwPhiP;
    where fdwPhi = PHI.
```

For the PAL system (step 522), the process is basically identical, except that the phase of the subcarrier changes from line to line, an occurrence known as the PAL switch. To detect the value of the PAL switch, which could be 0 or 1, the subcarrier phase is compared between two adjacent lines, which can be the first two lines of one frame (step 524), using a fixed number of digital samples between the color bursts of the two lines, and a determination is made as to which phase is leading the other (step 530). An example of this method is shown below for a sampling rate of 10.240 Mhz:

```
    if( dwPhiTempA >= 0 && dwPhiTempB >= 0 )
        fdwPhiP = 2*PI + atan( -(dwPhiTempB/dwPhiTempA) );
    else if( dwPhiTempA < 0 && dwPhiTempB < 0 )
        fdwPhiP = PI + atan( -(dwPhiTempB/dwPhiTempA) );
    else if( dwPhiTempA < 0 && dwPhiTempB >= 0 )
        fdwPhiP = PI + atan( -(dwPhiTempB/dwPhiTempA) );
    else if( dwPhiTempA >= 0 && dwPhiTempB < 0 )
        fdwPhiP = atan( -(dwPhiTempB/dwPhiTempA) );
    fdwXi = !fdwXi;
    where fdwXi is the PAL switch.
```

To compare the initial two lines and determine the initial value of the switch, the following algorithm could be used:

```
if( fdwPhiFirst = FirstLine)
    {
        if (fabs (fdwPhiFirst - fdwPhiP) > PI)
        {
        if((fdwPhiP + 0.76) > fdwPhiFirst )
// 0.2 obtained as [(624 + 32) * 2.719)mod(2*PI]*2*PI
        {
            fdwXi = 1;
        }
        else
        {
            fdwXi = 0;
        }
    }
    else
    {
        if((fdwPhiP + 0.76) > fdwPhiFirst )
        {
            fdwXi = 0;
        }
        else
        {
            fdwXi = 1;
        }
    }
}
fdwPhi = -fdwXi*PI/2 + 3.4 + fdwPhiP;
where fdwPhi is the PAL subcarrier phase corrected for the PAL switch.
```

Figure 6:
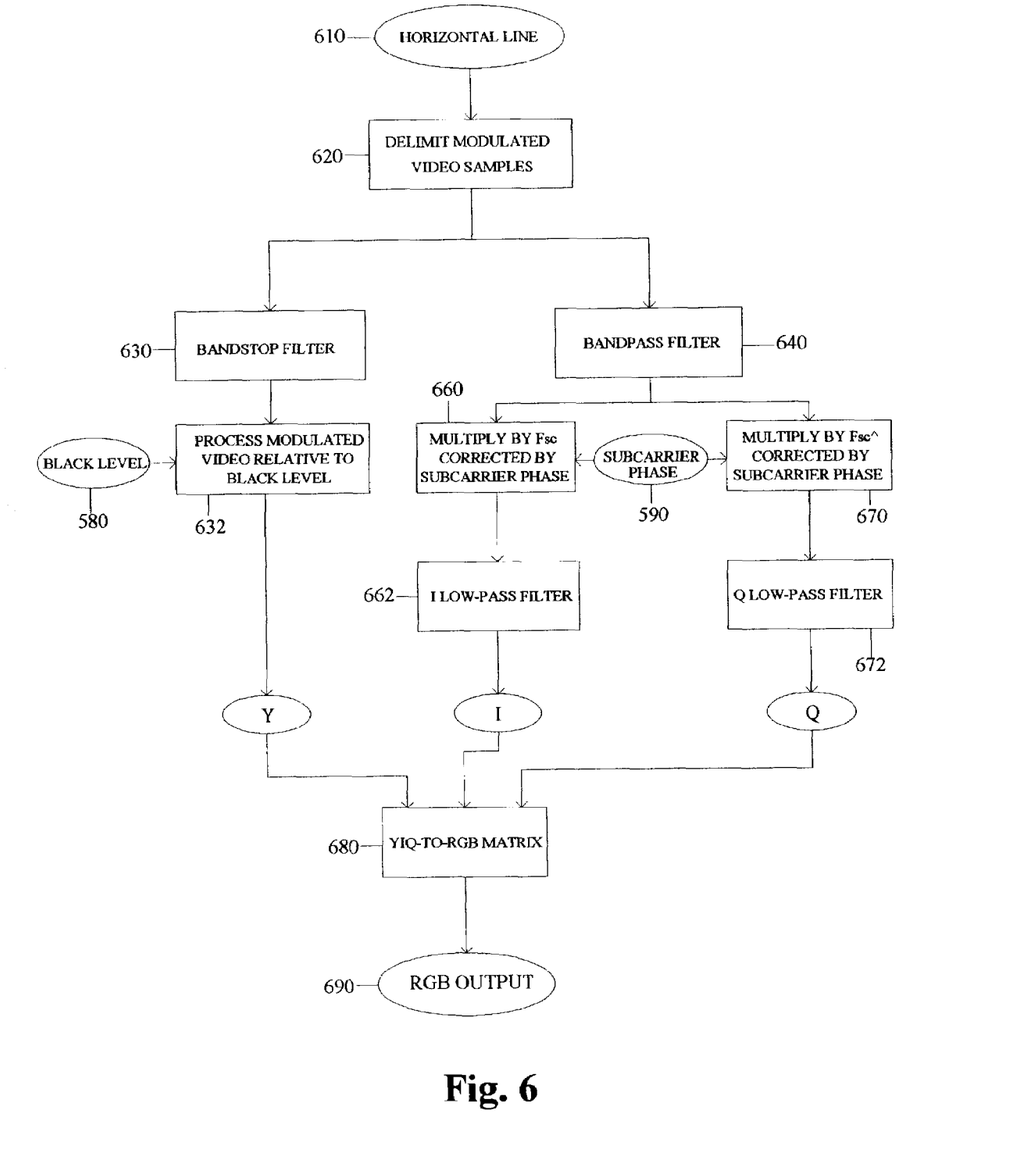
FIG. 6 shows a Y, I, and Q decoding and RGB conversion operation flowchart of the DSP composite video decoder.

Description of FIG. 6—Y, I and Q Decoding and RGB Conversion

The composite digital data of an interpolated horizontal line 610 is delimited in step 620 by essentially bypassing the color burst samples after a line start. The modulated video samples are passed through a notch or bandstop filter 630, which may be a high-order (typically 43 taps) digital filter with a notch frequency approximately equal to the subcarrier frequency (3.58 Mhz for NTSC) and a bandstop of about 600–800 Khz. Alternatively, a high-order low-pass filter of with a cut-off frequency in the order of 3.2 Mhz for an NTSC signal can be used, instead of the bandstop filter. The resulting signal generated by this processing step is what is known as the Y color components or luminance of the digital composite signal.

The modulated video samples are also passed through a high-order (typically 21 taps) bandpass filter 640, to extract the modulated subcarrier signal from the digital composite video. The output of this filter is an intermediate signal referred to as IQ'. Signal IQ' is fed into two mixers 660 and 670, respectively. Mixer 660 has a second input from a locally generated cosine function, cos(omega*T+PHI), which could be an arithmetic function or a look-up table, where "omega" is the subcarrier frequency multiplied by the constant 2*PI and "PHI" is a phase correction value, typically changing for each line, provided by the subcarrier phase recovery function step already described in FIG. 5. The output from mixer 660 is a temporary signal referred to as I'. Signal I' is further passed through a high-order (typically 22nd order) filter 662 and becomes what is known as color component I.

Mixer 670 has a second input from a locally generated sine function, sin(omega*T+PHI), which could be an arithmetic function or a look-up table, where "omega" is the subcarrier frequency multiplied by the constant 2*PI and "PHI" is a phase correction value, typically changing for each line, provided by the subcarrier phase recovery function already described in FIG. 5. The output from mixer 670 is a temporary signal referred to as Q'. Signal Q' is further processed through a high-order (typically 22nd order) low-pass filter 26 and becomes what is known as color component Q.

Note that the filter order of the Y component (43) is approximately equal to the sum of the filter orders for the I and Q components, respectively. This assures that the delay in each processing block is the same, and the values resulting for each color component refers to the same pixel when they are combined.

Following are program code samples used to implement the functions of mixers 660 and 670 for PAL and NTSC, respectively:

```
if( kPAL == fvideoFormat )
{
  cosResult = -2.0 * (2*fdwXi-1) * cos( x * kPAL_OmegaT +
    fdwPhi );
  sinResult = 2.0 * sin( x * kPAL_OmegaT + fdwPhi );
  dbl_limit = LimitResult( dbl_bandpass[x], -87, 87 );
}
else
{
  cosResult = 2.0 * cos( x * kNTSC_OmegaT + fdwPhi + fdbl_C );
  sinResult = 2.0 * sin( x * kNTSC_OmegaT + fdwPhi + fdbl_C );
  dbl_limit = LimitResult( dbl_bandpass[x], -82, 82 );
}
    dbl_IResult[x] = (dbl_limit * cosResult);
    dbl_QResult[x] = (dbl_limit * sinResult);
}
*dbl_IPrim = dbl_IResult;
*dbl_QPrim = dbl_QResult;
Note that the results of each computations are bounded between the limits
of 0 and 255 to prevent DSP processing errors.
```

The conversion of YIQ to RGB is implemented in step 680 using a YIQ-to-RGB conversion matrix, as shown below for NTSC:

$bR\text{Value}=\text{LimitResult}((int)((Y[x]*1.969)+ (\text{limit}I*1.879)+(\text{limit}Q*1.216)));$ $bG\text{Value}=\text{LimitResult}((int)((Y[x]*1.969)- (\text{limit}I*0.534)-(\text{limit}Q*1.273)));$ $bB\text{Value}=\text{LimitResult}((int)((Y[x]*1.969)- (\text{limit}I*2.183)+(\text{limit}Q*3.354)));$

CONCLUSION

The above description of the system illustrates numerous advantages of the DSP software decoding disclosed. Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

The invention inclaimed is:

1. A method to convert digital composite video to standard RGB color components comprising the steps of:
    detecting a horizontal line start;
    detecting the DC level of the color burst sub-carrier for said horizontal line;
    detecting the phase of the color burst sub-carrier for said horizontal line;
    processing the digital composite samples of said horizontal line with respect to said color burst DC level to generate a gray-scale component;
    processing the digital composite samples of said horizontal line with respect to said color burst phase to generate a first color component and a second color component; and
    processing said gray-scale component, first color component, and second color component to generate standard color components R, G, and B for said horizontal line.

2. The method of claim 1, wherein the digital composite video samples of said horizontal line are interpolated to determine a more precise line start reference with respect to preceding and subsequent horizontal lines.

3. The method of claim 1, wherein said DC level of the color burst sub-carrier is detected by averaging the digital video samples constituting the sub-carrier signal.

4. The method of claim 1, wherein said phase of the color burst sub-carrier is detected by performing at least one DFT computation to determine the coefficient of the frequency component closest to said sub-carrier frequency.

5. The method of claim 1, wherein said gray-scale component is obtained by using the DC level of the color burst as the black level reference of a gray-scale representation.

6. The method of claim 1, wherein said first color component is obtained by mixing a regenerated sub-carrier frequency having said detected phase with the digital composite video samples of said horizontal line.

7. The method of claim 1, wherein said second color component is obtained by mixing a regenerated sub-carrier frequency having said detected phase, offset by 90 degrees, with the digital composite video samples of said horizontal line.

8. The method of claim 1, wherein standard color components R, G, and B are a linear transformation of said gray-scale component, first color component, and second color component.

9. An apparatus to convert analog composite video to RGB color components without a phase-locked loop, comprising an analog-to-digital converter and a digital signal processor, wherein the black level of each video line of said analog composite video is determined by computing the average of digitized video samples between the horizontal sync pulse and the modulated video signal portions of said video line.

10. The apparatus of claim 9, wherein digital composite video samples of the modulated video signal portion of said video line are processed with respect to said black level to obtain a gray-scale component.

11. An apparatus to convert analog composite video to RGB color components without a phase-locked loop, comprising an analog-to-digital converter and a digital signal processor, wherein the color burst phase of each video line of said analog composite video is determined by performing a DFT computation of digitized video samples between the horizontal sync pulse and the modulated video signal portions of said video line, to determine at least one coefficient term of the frequency closest to the color sub-carrier of said video line.

* * * * *